(12) United States Patent
Nara

(10) Patent No.: US 7,583,374 B2
(45) Date of Patent: Sep. 1, 2009

(54) MEASUREMENT METHOD AND MEASUREMENT APPARATUS USING TRACKING TYPE LASER INTERFEROMETER

(75) Inventor: Masayuki Nara, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 12/105,605

(22) Filed: Apr. 18, 2008

(65) Prior Publication Data

US 2008/0259311 A1    Oct. 23, 2008

(30) Foreign Application Priority Data

Apr. 20, 2007    (JP)    ............................. 2007-112134

(51) Int. Cl.
*G01B 11/26*    (2006.01)
(52) U.S. Cl. .................................................. 356/152.3
(58) Field of Classification Search ....... 356/3.01–3.15, 356/4.01–4.1, 5.01–5.15, 6–22
See application file for complete search history.

(56) References Cited

U.S. PATENT DOCUMENTS 4,714,339 A * 12/1987 Lau et al. .................... 356/4.09

FOREIGN PATENT DOCUMENTS

| EP | 1 750 085 | 2/2007 |
|----|-----------|--------|
| EP | 1 857 772 | 11/2007 |
| JP | 07-120213 | 5/1995 |
| WO | 01/09643 | 2/2001 |

* cited by examiner

*Primary Examiner*—Thomas H Tarcza
*Assistant Examiner*—Luke D Ratcliffe
(74) *Attorney, Agent, or Firm*—Rankin, Hill & Clark LLP

(57) ABSTRACT

A tracking type laser interferometer including: a retro-reflector 20 for reflecting incident measurement light and returning the same in the incident direction and a main body 10 having means for emitting measurement light, means 30 for receiving return light reflected by the recursive reflector and returned therefrom, and means 40 for controlling the emission direction of measurement light so that the distance between both optical axes of measurement light and return light becomes constant at all times, and the tracking type laser interferometer outputs a measurement value in response to an increase or a decrease in distance between the reference point in the main body and the recursive reflector, wherein at least one light reflecting means 80 is disposed in an optical path between the main body 10 and the retro-reflector 20, and the directions of the optical axes of the measurement light and return light are changed, whereby without moving the tracking type laser interferometer, the measurement range can be expanded, and the measurement accuracy at a specific point can be improved.

9 Claims, 7 Drawing Sheets

US 7,583,374 B2

MEASUREMENT METHOD AND MEASUREMENT APPARATUS USING TRACKING TYPE LASER INTERFEROMETER

CROSS-REFERENCE TO RELATED APPLICATION

The disclosure of Japanese Patent Application No. 2007-112134 filed on Apr. 20, 2007 including specifications, drawings and claims is incorporated herein by reference in its entirety.

BACKGROUND OF THE INVENTION

1. Field of the Invention

The present invention relates to a measurement method and a measurement apparatus by a tracking type laser interferometer, and particularly to a measurement method and a measurement apparatus by a tracking type laser interferometer capable of expanding a measurement range and improving its measurement accuracy.

2. Description of the Related Art

As an apparatus that controls the emission direction of a laser beam being measurement light, tracks a recursive reflector (also called a retro-reflector) attached to a measurement object, and measures the distance to the recursive reflector by laser interference at high accuracy, a tracking type laser interferometer exists. Hereinafter, a description is given below of a tracking type laser interferometer represented by Japanese Patent Publication No. 2603429 (called Patent Document 1) based on a brief configurational view of FIG. 1.

The tracking type laser interferometer includes a retro-reflector 20 attached to a measurement object 70, means (not illustrated) for emitting measurement light, light receiving means 30, emission direction controlling means 40, and controlling means 50. And, the main body 10 is composed of the means (not illustrated) for emitting measurement light, the light receiving means 30 and the emission direction controlling means 40.

The retro-reflector 20 is an optical element in which the optical axis of incident light and that of emission light are parallel to each other, and the optical axis of incident light is symmetrical to the optical axis of reflecting light with respect to the center of the retro-reflector 20. Therefore, the retro-reflector 20 includes a function (the measurement light returned by reflection is called "return light") of reflecting and returning incident measurement light in the incident direction. Also, where measurement light is made incident into a position differ from the center of the retro-reflector 20, the position of the optical axes of the measurement light and the return light differ from each other. Therefore, the shift amount of the optical axes will be observed by the second light receiving means 36 described later.

The means for emitting the measurement light emits a part of a laser beam toward the retro-reflector 20 by means of a half mirror and so on. In addition, the other part of the laser beam is made incident into the first light receiving means 31 described later, as reference light for distance measurement.

The light receiving means 30 is composed of first light receiving means 31 used for measuring the distance from the reference point 60 in the main body 10 to the retro-reflector 20 fixed in the measurement object 70, and the second light receiving means 36 used for controlling and tracking the displacement of the retro-reflector 20. The first light receiving means 31 receives return light reflected by the retro-reflector 20 and returning therefrom and the reference light described above, and transmits the light receiving signals to the controlling means 50. On the other hand, the second light receiving means 36 receives the optical axis of the measurement light and the optical axis of the return light, and transmits signals pertaining to the shift amount of the optical axes to the controlling means 50.

The emission direction controlling means 40 is composed of a turning mechanism of two axes orthogonal to each other. In this case, the center position that is common to the two axes is made into the reference point 60. In addition, the shift amount of both optical axes, which is transmitted from the second light receiving means 36, is kept constant by the emission direction controlling means 40 at all times, so that distance measurement made by the first light receiving means 31 is not discontinued.

The controlling means 50 obtains a distance in response to an increase or a decrease in the distance between the reference point 60 and the retro-reflector 20 based on signals transmitted from the first light receiving means 31. Also, the controlling means 50 controls the emission direction controlling means 40 based on signals transmitted from the second light receiving means 36 so as to turn the emission direction of the measurement light to the retro-reflector 20.

With such a structure and functions, the turning angle information of the emission direction controlling means 40 and the distance observed by the first light receiving means 31 or the distance observed by the first light receiving means 31 are outputted as measurement values of the tracking type laser interferometer. That is, if the tracking type laser interferometer is used for measurement of three-dimensional coordinate values, in the former case, it is possible to obtain the coordinate values in a three-dimensional space directly from the measurement values, and in the latter case, it becomes possible to obtain similar coordinate values by carrying out three-side length measurement with a plurality of tracking type laser interferometers combined.

However, the measurement range of a conventional tracking type laser interferometer represented by Patent Document 1 described above is restricted by an alterable range of emission direction of the emission direction controlling means 40 and a reflectable range of a retro-reflector 20 being a recursive reflector. And, since electric wires and optical fibers are connected to the tracking type laser interferometer 10, there is restriction resulting from the structure thereof. Therefore, a dead angle that cannot be measured may be brought about in the measurement space.

For example, when the turning angle is considered in the paper surface, if the alterable range of the emission direction of the emission direction controlling means 40 is the angular range 12 shown in FIG. 2, no light can be made incident into the retro-reflector 20 in the range other than the above, wherein the measurement range is restricted to the angular range 12.

Also, since, with the conventional tracking type laser interferometer, the distance from the reference point 60 being the center of turning of the emission direction controlling means 40 to the retro-reflector 20 is measured, a change in distance is an order of the cosine error when the retro-reflector 20 is displaced vertically with respect to the optical axes composed of the reference point 60 and the retro-reflector 20, it is hardly reflected in distance measurement.

For example, when a case where upward displacement δ occurs on the paper surface of FIG. 3 is taken into consideration, the distance between the reference point 60 and the retro-reflector 20 changes from L to L1. At this time, the relationship between L, L1 and δ is expressed by equation (1) below.

$$L1 = (L^2 + \delta^2)^{1/2} = L*(1+(\delta/L)^2)^{1/2} \qquad (1)$$

Herein, if δ is small in comparison with L, Equation (1) becomes Equation (2) below.

$$L1 \approx L*(1+(\delta/L)^2/2) \approx L \qquad (2)$$

The change in the distance measurement value, which results from the retro-reflector 20 being displaced by δ, is a secondary amount of a minute quantity (δ/L), and it is not reflected in the distance measurement amount. Thus, there exists a position and a direction (called a specific point) where the length measurement sensitivity is remarkably worsened.

Also, in order to solve these problems and shortcomings, it is considered that the installation position of a tracking type laser interferometer is changed. However, there are cases where the tracking type laser interferometer cannot be moved, for example, cases where any interfering object exists in a position where it is desired to be installed and where no appropriately stable installation place can be found. Furthermore, since the tracking type laser interferometer is a precision measurement device, there are problematic points in installation and adjustment in connection with movement thereof.

SUMMARY OF THE INVENTION

The present invention was developed to solve such problems and shortcomings in prior arts, and it is therefore an object to provide a tracking type laser interferometer of a simple structure, which is capable of expanding its measurement range and improving the measurement accuracy at specific points without moving the tracking type laser interferometer.

A tracking type laser interferometer according to the present invention includes a recursive reflector for reflecting incident measurement light and returning the same in the incident direction and a main body having means for emitting measurement light, means for receiving return light reflected by the recursive reflector and returned therefrom, and means for controlling the emission direction of measurement light so that the distance between both optical axes of measurement light and return light becomes constant at all times, and outputs a measurement value in response to an increase or a decrease in distance between the reference point in the main body and the recursive reflector, wherein at least one light reflecting means is disposed in an optical path between the main body and the recursive reflector, and the directions of the optical axes of the measurement light and return light are changed, thereby solving the above-described problems.

The measurement range may be expanded by installing the light reflecting means so that measurement light emitted from the main body is reflected outside the alterable range of the emission direction of the emission direction controlling means.

Also, measurement light maybe made incident into the recursive reflector by the light reflecting means so that the optical axis of measurement light made incident into the recursive reflector is not orthogonal to the direction of displacement of the corresponding recursive reflector.

Further, measurement light may be made incident into the recursive reflector by the light reflecting means so that the optical axis of measurement light made incident into the recursive reflector is made coincident with the direction of displacement of the corresponding recursive reflector.

Still further, measurement may be carried out by regarding a virtual image position of the reference point formed by disposition of the light reflecting means as the reference point.

Also, the present invention provides a measurement apparatus using a tracking type laser interferometer including a recursive reflector for reflecting incident measurement light and returning the same in the incident direction and a main body having means for emitting measurement light, means for receiving return light reflected by the recursive reflector and returned therefrom, and means for controlling the emission direction of measurement light so that the distance between both optical axes of measurement light and return light becomes constant at all times, and outputs a measurement value in response to an increase or a decrease in distance between the reference point in the main body and the recursive reflector, wherein it is also provided with at least one light reflecting means that is disposed in an optical path between the main body and the recursive reflector, and reflects the measurement light.

According to the present invention, with a simple structure of providing light reflecting means, the measurement range can be expanded. Further, since the optical axis direction of incident measurement light into the recursive reflecting means can be changed by reflecting the measurement light by means of the light reflecting means, accuracy of measurement at the specific points can be improved.

These and other novel features and advantages of the present invention will become apparent from the following detailed description of a preferred embodiment.

BRIEF DESCRIPTION OF THE DRAWINGS

The preferred embodiment will be described with reference to the drawings, wherein like elements have been denoted throughout the figures with like reference numerals, and wherein.

DETAILED DESCRIPTION OF THE PREFERRED EMBODIMENTS

A preferred exemplary embodiment of the present invention will now be described in detail, with respect to the drawings.

Figure 4:
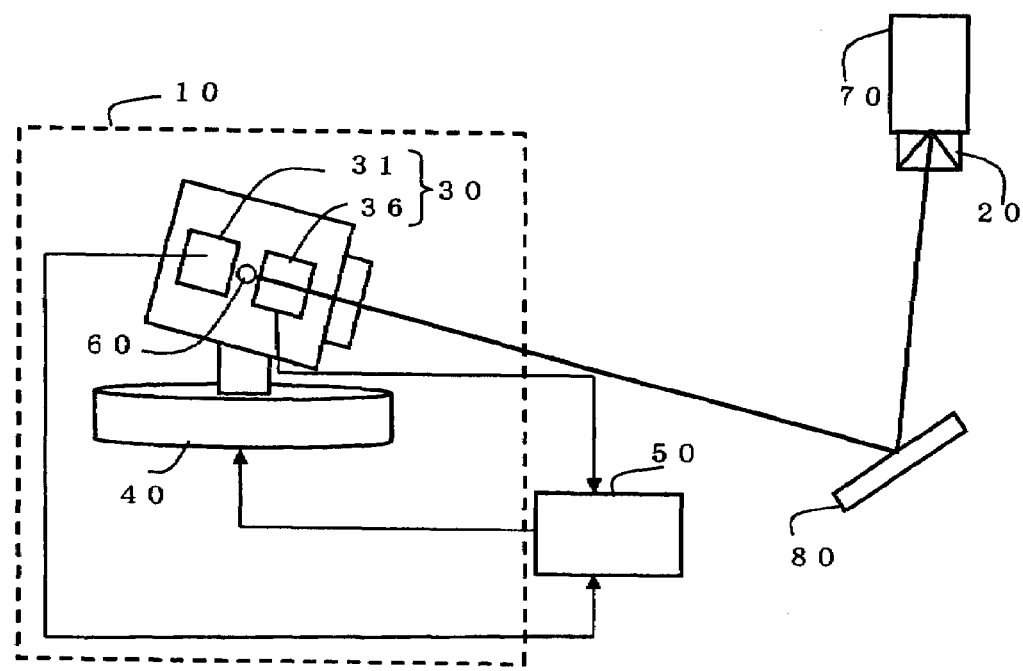
FIG. 4 is a schematic configuration view of a measurement apparatus using a tracking type laser interferometer according to an embodiment of the present invention.
Figure 5:
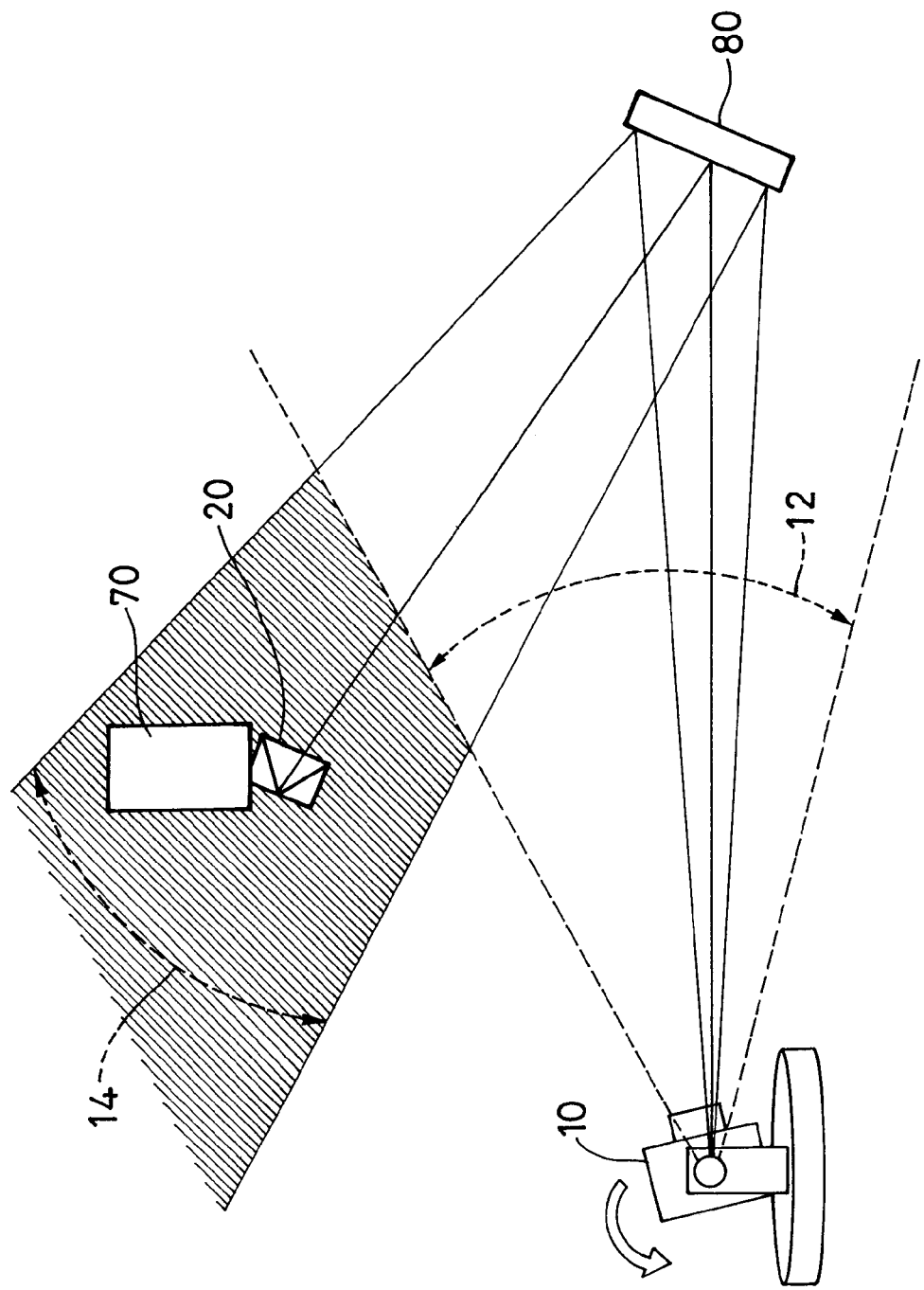
FIG. 5 is a view showing a measurable range of the embodiment.
Figure 6:
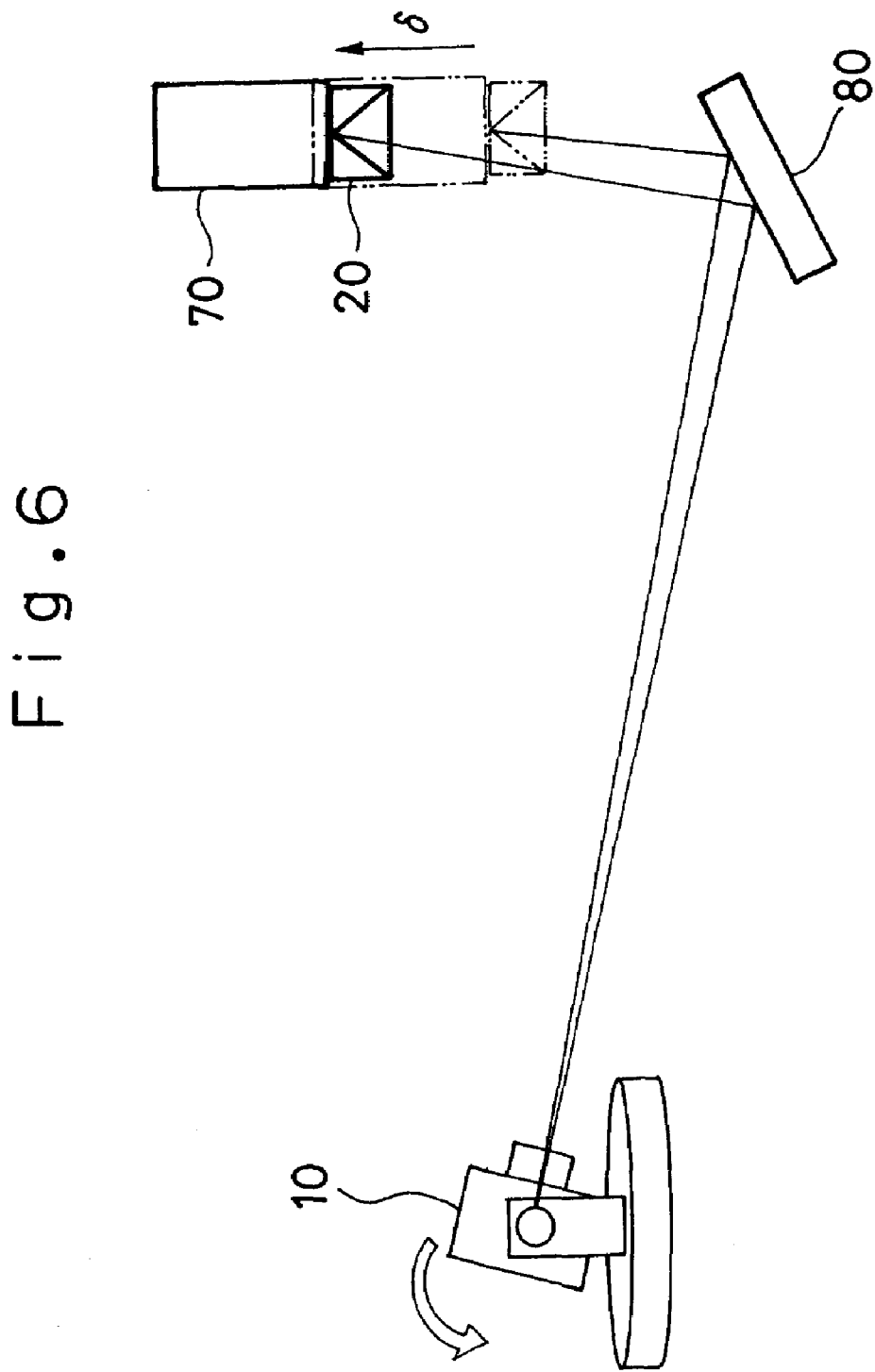
FIG. 6 is a view showing the device layout in the embodiment regarding a case of corresponding to the prior art specific points.
Figure 7:
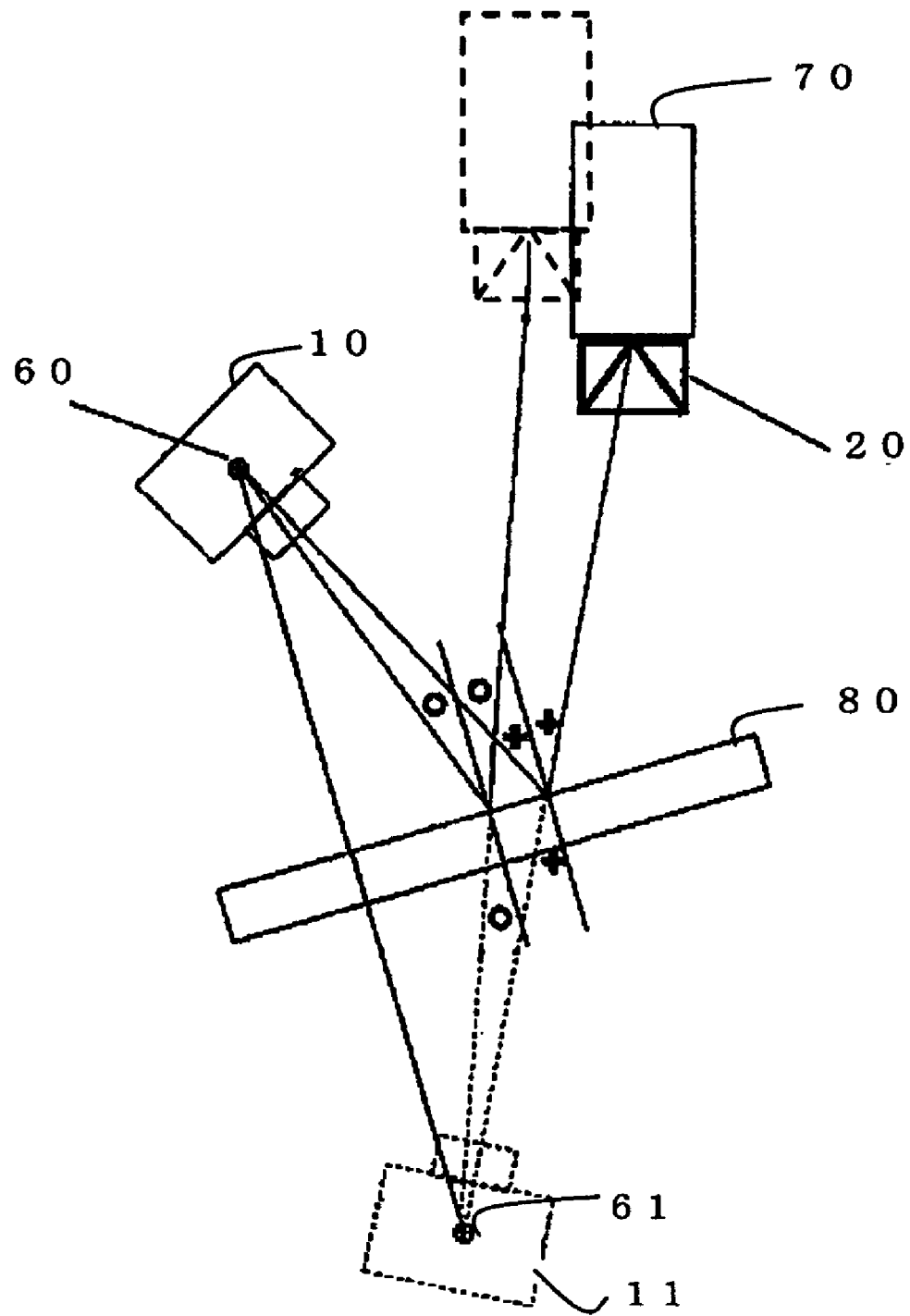
FIG. 7 is a view showing virtual images of the embodiment.

FIG. 4 is a schematic configuration view of a measurement apparatus using a tracking type laser interferometer according to the embodiment. FIG. 5 is a view showing a measurable range of the embodiment. FIG. 6 is a view showing the device layout in the embodiment regarding a case of corresponding to the prior art specific points, and FIG. 7 is a view showing virtual images of the embodiment.

As shown in FIG. 4, the embodiment includes light reflecting means 80, which is a characteristic component of the embodiment, in addition to a retro-reflector 20 attached to a measurement object 70, means (not illustrated) for emitting measurement light, light receiving means 30, emission direction controlling means 40 and controlling means 50, all of which are components of the prior art tracking type laser interferometer.

Figure 1:
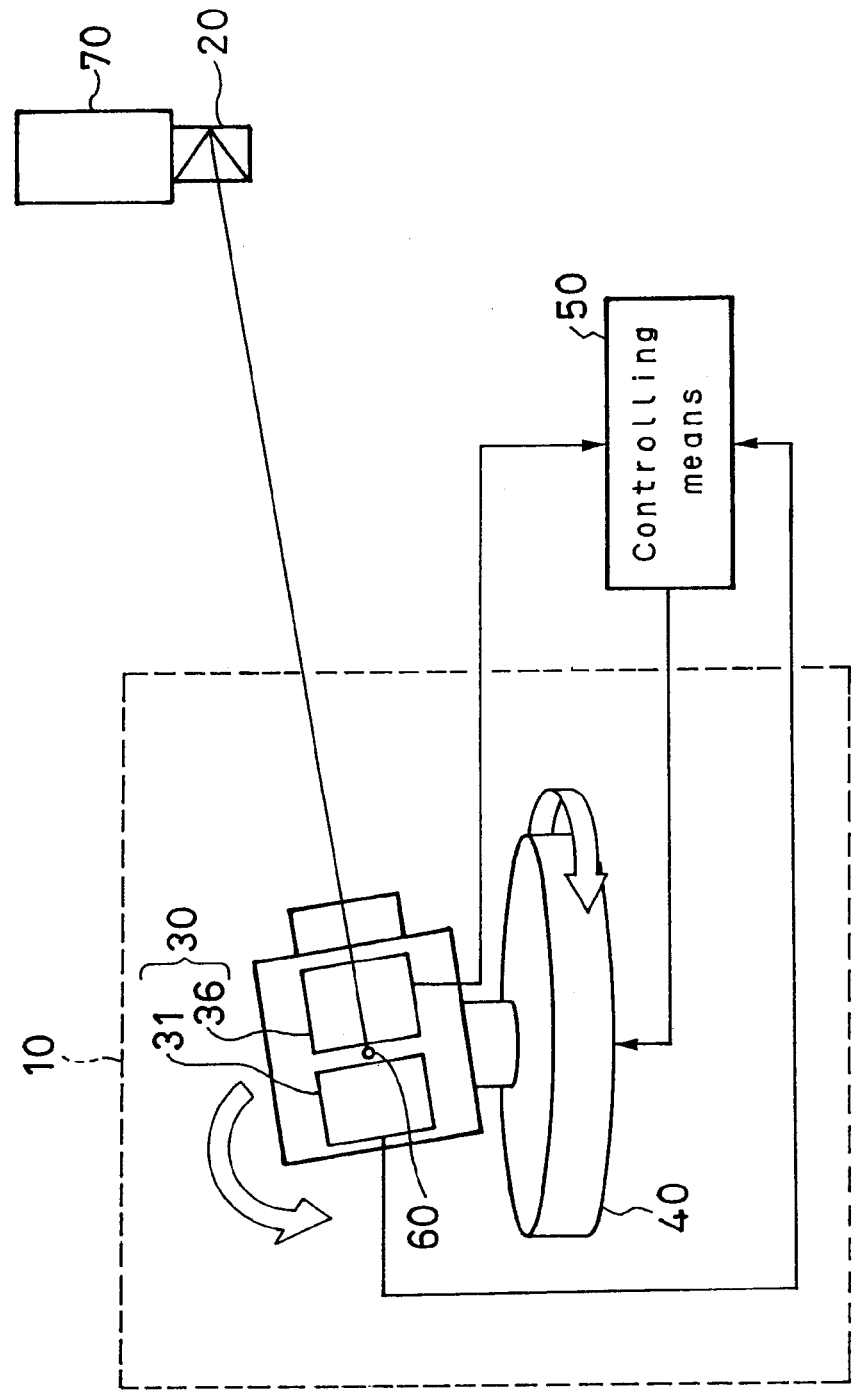
FIG. 1 is a schematic configurational view showing a prior art tracking type laser interferometer.

The light reflecting means 80 planarly reflects a laser beam that is measurement light. For example, a mirror having good flatness, which is available on the market, may be used. The components other than this are the same as those of the prior art tracking type laser interferometer shown in FIG. 1, and the description thereof is omitted.

Thus, the present embodiment may be remarkably simply constructed as shown in FIG. 4.

Next, a description is given of actions of the embodiment.

A laser beam being measurement light is emitted from the means for emitting measurement light. The measurement light is reflected by the light reflecting means 80 inserted in an optical path between the retro-reflector 20 and the main body 10. Since the reflection surface of the light reflecting means 80 is flat, the incident measurement light is reflected while it is parallel light if the measurement light is parallel light having parallelism. The reflected measurement light is made incident into the retro-reflector 20. The incident measurement light is reflected in the incident direction by the retro-reflector 20. The reflected light becomes return light and is reflected again by the light reflecting means 80 while keeping parallelism and is received by the light receiving means 30. At this time, the first light receiving means 31 transmits a signal to measure the distance between the reference point 60 and the retro-reflector 20 via the reflection surface of the light reflecting means 80 to the controlling means 50. The controlling means 50 acquires the distance based on the signal. The second light receiving means 36 transmits to the controlling means 50 a position signal concerning a shift of both optical axes of measurement light emitted to the retro-reflector 20 and the return light. And, the controlling means 50 carries out turning control of the emission direction controlling means 40 based on the signal from the second light receiving means 36 in order to turn the measurement light to the retro-reflector 20 so that measurement of distance by the first light receiving means 31 is not discontinued.

Thus, the embodiment has an advantage by which control operation of the prior art tracking type laser interferometer is not made complicated.

Figure 2:
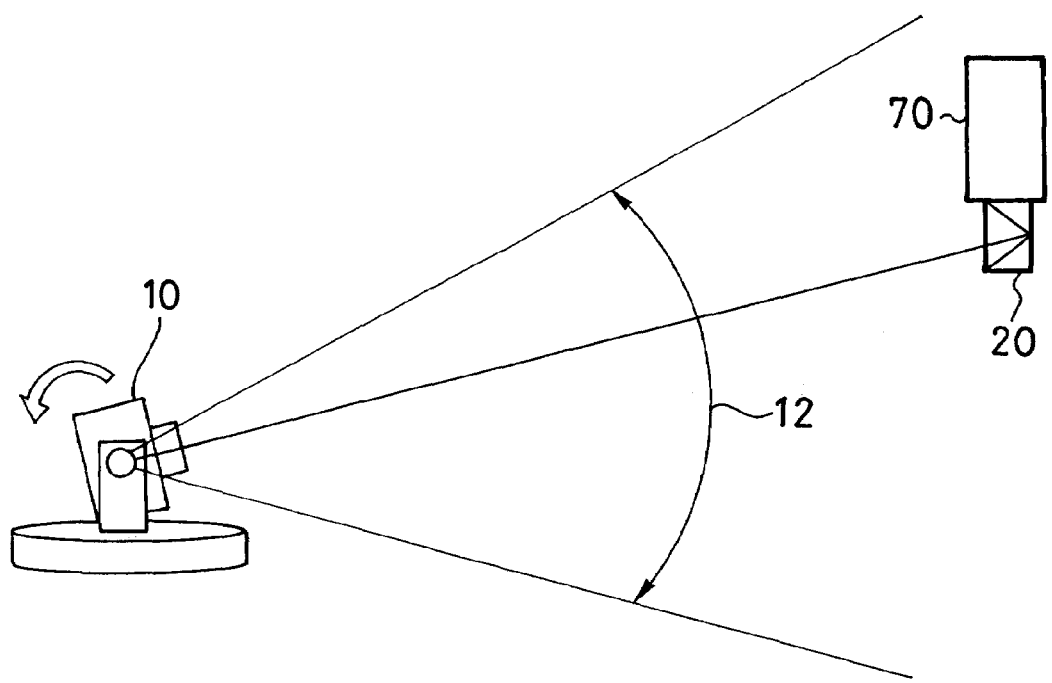
FIG. 2 is a view showing a measurable range of the same tracking type laser interferometer.

Next, a description is given below of a measurable range according to the embodiment.

Where the alterable range of the emission direction of the emission direction controlling means 40 is an angular range 12 on the paper surface as shown in FIG. 2, if the light reflecting means 80 is disposed in the angular range 12 as shown in FIG. 5, the range of measurement is expanded to an angular range 14 outside the angular range 12 by reflection of the light reflecting means 80. Therefore, the retro-reflector 20 may be disposed in the angular range 14. That is, by installing the light reflecting means 80, it becomes possible to easily expand the range of measurement to the angular range 14 that cannot be measured without changing the position of the tracking type laser interferometer in the prior art.

Figure 3:
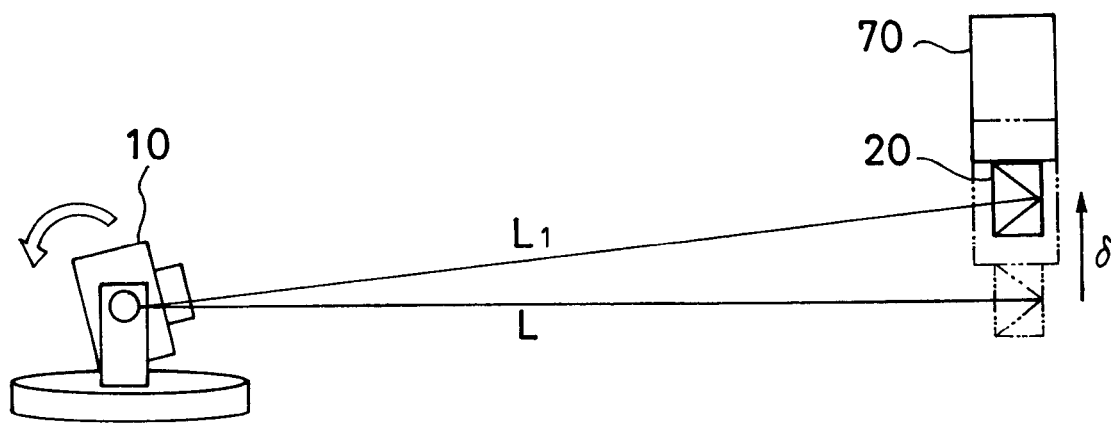
FIG. 3 is a view showing the device layout at specific points according to the same tracking type laser interferometer.

Next, a description is given below of measurement accuracy at specific points in the embodiment.

Where the retro-reflector 20 is displaced by δ in the upper direction on the paper surface as shown in FIG. 3, it becomes possible to measure the distance by disposing the light reflecting means 80 in the vicinity downward of the retro-reflector 20 on the paper surface as shown in FIG. 6. Herein, as shown in FIG. 3, the measurement accuracy is lowered since the case of displacement δ corresponds to the specific point in the disposition of the prior art tracking type laser interferometer. This is because, in distance measurement by a tracking type laser interferometer, the measurement sensitivity with respect to the displacement amount in the direction orthogonal to the optical axis is remarkably worse although the measurement sensitivity is satisfactory with respect to the displacement amount in the same direction as the optical axis of measurement light. However, in the embodiment, by reflecting measurement light by means of the light reflecting means 80, the incident direction of measurement light into the retro-reflector 20, that is, the optical axis is not made orthogonal to the displacement direction but is rather made coincident therewith. Accordingly, since the tracking type laser interferometer may be used in a state where the measurement sensitivity is satisfactory, it becomes possible to further improve the measurement accuracy than in the prior arts without moving the tracking type laser interferometer.

Next, using FIG. 7, a description is given of a case where measurement is carried out using, as the reference point, a virtual image position produced when using the light reflecting means 80. Where the light reflecting means 80 is used, the virtual images of the main body 10 of the tracking type laser interferometer and the reference point 60 thereof are determined at the positions 11 and 61 shown in FIG. 7. Therefore, measurement of the distance to the retro-reflector 20 can be easily obtained by using the virtual image position 61 of the reference point 60 as the reference point without being conscious of the existence of the light reflecting means 80. Also, the virtual image position is equivalent to the tracking type laser interferometer 10 having been virtually moved to the position 11. Therefore, it becomes possible to sufficiently take disposition of the light reflecting means 80 into consideration by being conscious of these virtual image positions in advance, so that the specific points and problems for the measurement range as in the prior art can be avoided.

In the above description, the light reflecting means 80 is achieved by a plane mirror in the embodiment. However, for example, a prism is also included in the present invention. Further, although reflection made by the light reflecting means 80 is 1 time in the embodiment, the present invention may also include a case where a plurality of light reflecting means 80 are provided and the number of times of reflection is made a plurality. In addition, in the above embodiment, the controlling means is not contained in the main body of the tracking type laser interferometer. However, as a matter of course, it is included in the present invention that the components including the controlling means are regarded as the main body.

Further, the present invention is effective in preventing restriction of the measurement range, which is brought about by a reflectable range of the retro-reflector 20.

It should be apparent to those skilled in the art that the above-described exemplary embodiment is merely illustrative which represents the application of the principles of the present invention. Numerous and various other arrangements can be readily devised by those skilled in the art without departing from the spirit and the scope of the present invention.

What is claimed is:

1. A measurement method using a tracking type laser interferometer that includes:
   a recursive reflector for reflecting incident measurement light and returning the same in the incident direction and a main body having means for emitting measurement light, means for receiving return light reflected by the recursive reflector and returned therefrom, and means for controlling the emission direction of measurement light so that the distance between both optical axes of measurement light and return light becomes constant at all times, and outputs a measurement value in response to an increase or a decrease in distance between the reference point in the main body and the recursive reflector, the method comprising the steps of:

disposing at least one light reflecting means in an optical path between the main body and recursive reflector; and changing the directions of the optical axes of measurement light and return light, wherein measurement is carried out by regarding a virtual image position of the reference point, which is formed by disposition of the light reflecting means, as the reference point.

2. The measurement method using the tracking type laser interferometer according to claim 1, wherein the measurement range is expanded by installing the light reflecting means so that measurement light emitted from the main body is reflected outside the alterable range of the emission direction of the emission direction controlling means.

3. The measurement method using the tracking type laser interferometer according to claim 1, wherein measurement light is made incident into the recursive reflector by the light reflecting means so that the optical axis of measurement light made incident into the recursive reflector is not orthogonal to the direction of displacement of the corresponding recursive reflector.

4. The measurement method using the tracking type laser interferometer according to claim 1, wherein measurement light is made incident into the recursive reflector by the light reflecting means so that the optical axis of measurement light made incident into the recursive reflector is made substantially coincident with the direction of displacement of the recursive reflector.

5. A measurement apparatus using a tracking type laser interferometer including:

a recursive reflector for reflecting incident measurement light and returning the same in the incident direction and a main body having means for emitting measurement light, means for receiving return light reflected by the recursive reflector and returned therefrom, and means for controlling the emission direction of measurement light so that the distance between both optical axes of measurement light and return light becomes constant at all times, which outputs a measurement value in response to an increase or a decrease in distance between the reference point in the main body and the recursive reflector, wherein at least one light reflecting means is provided which is disposed in an optical path between the main body and the recursive reflector, and reflects the measurement light, wherein measurement is carried out by regarding a virtual image position of the reference point, which is formed by disposition of the light reflecting means, as the reference point.

6. The measurement apparatus using the tracking type laser interferometer according to claim 5, wherein the measurement range is expanded by installing the light reflecting means so that measurement light emitted from the main body is reflected outside the alterable range of the emission direction of the emission direction controlling means.

7. The measurement apparatus using the tracking type laser interferometer according to claim 5, wherein measurement light is made incident into the recursive reflector by the light reflecting means so that the optical axis of measurement light made incident into the recursive reflector is not orthogonal to the direction of displacement of the corresponding recursive reflector.

8. The measurement apparatus using the tracking type laser interferometer according to claim 5, wherein measurement light is made incident into the recursive reflector by the light reflecting means so that the optical axis of measurement light made incident into the recursive reflector is made substantially coincident with the direction of displacement of the recursive reflector.

9. A measurement method using a tracking type laser interferometer, comprising the steps of:

providing a tracking type laser interferometer that includes:

a recursive reflector for reflecting incident measurement light and returning the same in the incident direction, a main body having means for emitting measurement light, means for receiving return light reflected by the recursive reflector and returned therefrom, and means for controlling the emission direction of measurement light, and at least one light reflecting means provided in an optical path between the main body and the recursive reflector;

emitting measurement light toward the at least one light reflecting means using the means for emitting measurement light;

directing the measurement light reflected from the at least one light reflecting means to the recursive reflector;

reflecting light incident on the recursive reflector as return light from the recursive reflector to the at least one light reflecting means;

redirecting the return light reflected from the recursive reflector by the at least one light reflecting means toward the main body;

receiving the return light by the means for receiving return light in the main body;

changing the direction of the optical axes of measurement light and return light such that the distance between both optical axes of measurement light and return light remains constant at all times using the means for controlling the emission direction of measurement light;

changing the direction of the optical axes of measurement light and return light such that measurement light made incident into the recursive reflector by the at least one light reflecting means is substantially coincident with and not orthogonal to the direction of displacement of the corresponding recursive reflector using the means for controlling the emission direction of measurement light; and outputting a measurement value in response to an increase or a decrease in distance between a reference point in the main body and the recursive reflector.

* * * * *